United States Patent
Kanda et al.

(10) Patent No.: US 9,840,587 B2
(45) Date of Patent: Dec. 12, 2017

(54) POLYAMIDE PRODUCTION METHOD

(71) Applicant: Cheil Industries Inc., Gumi-si (KR)

(72) Inventors: Tomomich Kanda, Yokohamashi (JP); Tomoaki Shimoda, Yokohamashi (JP)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 0 days.

(21) Appl. No.: 14/437,523

(22) PCT Filed: Oct. 23, 2013

(86) PCT No.: PCT/KR2013/009486
§ 371 (c)(1),
(2) Date: Apr. 22, 2015

(87) PCT Pub. No.: WO2014/065594
PCT Pub. Date: May 1, 2014

(65) Prior Publication Data
US 2015/0329672 A1    Nov. 19, 2015

(30) Foreign Application Priority Data

Oct. 23, 2012  (JP) ................................. 2012-233762
Oct. 2, 2013   (KR) ........................ 10-2013-0118205

(51) Int. Cl.
*C08G 69/26* (2006.01)
*C08G 69/30* (2006.01)
*C08G 69/28* (2006.01)
C08G 69/46 (2006.01)

(52) U.S. Cl.
CPC ............. *C08G 69/30* (2013.01); *C08G 69/26* (2013.01); *C08G 69/265* (2013.01); *C08G 69/28* (2013.01); *C08G 69/46* (2013.01)

(58) Field of Classification Search
CPC ....... C08L 77/06; C08G 69/26; C08G 69/265; C08G 69/06; C08G 69/46; C08G 69/30
See application file for complete search history.

(56) References Cited

U.S. PATENT DOCUMENTS

| | | | |
|---|---|---|---|
| 4,831,108 A | 5/1989 | Richardson et al. | |
| 6,156,869 A | 12/2000 | Tamura et al. | |
| 9,115,247 B2 | 8/2015 | Shikano et al. | |
| 2011/0028614 A1* | 2/2011 | Shikano | C08G 69/265 524/126 |
| 2011/0224370 A1* | 9/2011 | Kanda | C08G 69/26 524/606 |
| 2012/0271031 A1* | 10/2012 | Kikuchi | C08G 69/28 528/347 |

FOREIGN PATENT DOCUMENTS

| | | |
|---|---|---|
| JP | S32-006148 | 8/1957 |
| JP | S44-020637 | 9/1969 |
| JP | S47-015106 | 5/1972 |
| JP | S47-033277 | 8/1972 |
| JP | H08-03312 A | 1/1996 |
| JP | 08-073587 A | 3/1996 |
| JP | 2003-165838 A | 6/2003 |
| JP | 2010-215682 | 9/2010 |
| JP | 2010-280875 A | 12/2010 |
| JP | 2012-153749 A | 8/2012 |
| JP | 2012-180486 A | 9/2012 |
| JP | 2013-124285 A | 6/2013 |
| JP | 2013-124287 A | 6/2013 |
| KR | 10-2000-0012076 A | 2/2000 |
| KR | 10-2010-0115796 A | 10/2010 |
| KR | 10-2011-0084158 A | 7/2011 |
| KR | 10-2012-0102055 A | 9/2012 |
| WO | 2009-113590 A1 | 9/2009 |
| WO | 2010-032719 A1 | 3/2010 |
| WO | 2014/065594 A1 | 5/2014 |

OTHER PUBLICATIONS

International Search Report in counterpart International Application No. PCT/KR2013/009486 dated Jan. 27, 2014, pp. 1-4.
Office Action in counterpart Japanese Application No. 2012-233762 dated Feb. 23, 2016, pp. 1-2.
Office Action in counterpart Korean Application No. 10-2013-0118205 dated Feb. 11, 2016, pp. 1-4.

* cited by examiner

*Primary Examiner* — Gregory Listvoyb
(74) *Attorney, Agent, or Firm* — Additon, Higgins & Pendleton, P.A.

(57) ABSTRACT

The polyamide production method of the present invention comprises the steps of: producing a low-order condensate by effecting a polycondensation reaction between a dicarboxylic acid component containing between about 5 and about 40 mol. % of terephthalic acid, and a diamine component containing between about 70 and about 100 mol. % of a xylylenediamine in which the content of paraxylylenediamine is between about 50 and about 100 mol. %, under conditions of a reaction temperature of at least about 200° C. and less than about 230° C.; discharging and cooling the low-order condensate at a pressure at or below atmospheric pressure, in an inert gas atmosphere; and subjecting the discharged and cooled low-order condensate to solid state polymerization. The production method makes it possible to obtain a polyamide having outstanding mechanical strength, heat resistance, color tone and the like without problems such as gelling.

6 Claims, No Drawings

POLYAMIDE PRODUCTION METHOD

CROSS-REFERENCE TO RELATED APPLICATIONS

This application claims priority to and the benefit of International Application No. PCT/KR2013/009486, filed Oct. 23, 2013, which published as WO 2014/065594 on May 1, 2014; Korean Patent Application No. 10-2013-0118205, filed in the Korean Intellectual Property Office on Oct. 2, 2013; and Japanese Patent Application No. 2012-233762, filed in the Japanese Patent Office on Oct. 23, 2012, the entire disclosure of each of which is incorporated herein by reference.

TECHNICAL FIELD

The present invention relates to a polyamide production method. More particularly, the present invention relates to a polyamide production method which can provide polyamides exhibiting excellent properties in terms of mechanical strength, heat resistance, color, and the like without gelation.

BACKGROUND ART

With excellent properties and easy melt molding, polyamides are broadly applied to materials for clothes, fibers for industrial materials, engineering plastics, and the like. However, general polyamides have problems of insufficient heat resistance, low dimensional stability caused by absorption, and the like. Recently, polyamides used in the field of electric/electronic components, car components, and the like are required to have further improved properties and functions. Particularly, there is a need for development of polyamides that have further improved properties in terms of high thermal resistance, dimensional stability, mechanical properties, chemical resistance, treatment in polymerization or molding, and the like.

In a polyamide production method known in the art, polyamides are produced through polycondensation by heating a salt or a low-order condensate formed of typical dicarboxylic acid and diamine under melting conditions. Such a production method can be applied to a method for producing polyamides using p-xylylenediamine as a diamine component. For example, a method for producing polyamides from p-xylylenediamine, m-xylylenediamine, and aliphatic dicarboxylic acid (see JP Patent Publication No. S32-06148, JP Patent Publication No. S44-20637, and JP Patent Publication No. S47-15106), a method for preparing polyamides from p-xylylenediamine, hexamethylenediamine, adipic acid and terephthalic acid (see JP Patent Publication No. S47-33277), etc. In addition, JP Patent Laid-open Publication No. H08-03312 discloses a method for producing polyamides having a structure derived from xylylenediamine and benzene dicarboxylic acid through multistage melt polymerization using a plurality of polymerizing devices.

However, when applied to preparation of polyamides having a high melting point, the above methods can cause pyrolysis of reaction products due to high temperature conditions for maintaining a molten state and the polyamides prepared by the methods are likely to suffer from property deterioration in terms of mechanical strength, heat resistance, color, and the like. Moreover, the polyamides prepared by the above methods have high viscosity and are difficult to treat due to gel content thereof, and are likely to remain on an inner wall of a reactor, thereby causing reduction in yield.

DISCLOSURE

Technical Problem

It is one object of the present invention to a polyamide production method that can prevent a problem such as gelation in preparation of polyamides.

It is another object of the present invention to provide a polyamide production method that can produce polyamides exhibiting good mechanical strength, heat resistance and color while securing good balance therebetween.

The above and other objects of the present invention can be accomplished by the present invention described below.

Technical Solution

One aspect of the present invention relates to a polyamide production method. The production method includes: preparing a low-order condensate through polycondensation of a dicarboxylic acid component containing about 5 mol % to about 40 mol % of terephthalic acid and a diamine component containing about 50 mol % to about 100 mol % of p-xylylenediamine and about 70 mol % to about 100 mol % of xylylenediamine at a reaction temperature of about 200° C. to less than about 230° C.; discharging and cooling the low-order condensate at atmospheric pressure or less under an inert gas atmosphere; and solid-polymerizing the discharged and cooled low-order condensate.

In one embodiment, the process of preparing the low-order condensate may be performed under conditions of a reaction pressure of about 0.5 MPa to about 3 MPa, a reaction time of about 0.5 hours to about 4 hours, and a moisture content of about 15 wt % to about 35 wt % in a reaction system upon completion of reaction, and the discharged and cooled low-order condensate may have an inherent viscosity of about 0.07 dL/g to about 0.40 dL/g, as measured at a concentration of about 0.5 g/dL and at a temperature of about 25° C. in concentrated sulfuric acid.

In one embodiment, the solid polymerization may be performed at a maximum reaction temperature of about 170° C. to about 210° C.

In one embodiment, the polyamide may have a melting point of about 280° C. or more and a glass transition temperature of about 100° C. or more.

In one embodiment, the polycondensation may be performed in the presence of an end-capping agent.

In one embodiment, the method may further include an enrichment process before preparation of the low-order condensate.

Advantageous Effects

The present invention provides a polyamide production method that can prevent problems in preparation such as gelation and the like, and can produce polyamides exhibiting good mechanical strength, heat resistance and color while securing good balance therebetween.

BEST MODE

Hereinafter, embodiments of the present invention will be described in more detail.

A polyamide production method according to the present invention is a method of producing polyamide, which comprises a dicarboxylic acid component containing about 5 mol % to about 40 mol % of terephthalic acid and a diamine component containing about 50 mol % to about 100 mol % of p-xylylenediamine and about 70 mol % to about 100 mol % of xylylenediamine, and can prevent problems, such as gelation and the like. The production method may include: (A) preparing a low-order condensate through polycondensation of the dicarboxylic acid component and the diamine component at a reaction temperature of about 200° C. to less than about 230° C.; (B) discharging and cooling the low-order condensate at atmospheric pressure or less under an inert gas atmosphere; and (C) solid-polymerizing the discharged and cooled low-order condensate.

<Process of Preparing Low-Order Condensate>

In this process, polycondensation of the dicarboxylic acid component and the diamine component is performed to prepare a low-order condensate of polyamide.

The dicarboxylic acid component comprises about 5 mol % to about 40 mol % of terephthalic acid and about 60 mol % to about 95 mol % of dicarboxylic acid excluding the terephthalic acid. Within this range, the prepared polyamide has good properties in terms of mechanical strength, heat resistance, color, and balance therebetween. A total sum of the terephthalic acid and the dicarboxylic acid excluding the terephthalic acid is 100 mol %.

In the dicarboxylic acid component, the terephthalic acid may be present in an amount of about 5 mol % to about 40 mol %, for example, about 5 mol % to about 30 mol %, specifically about 10 mol % to about 30 mol %. Within this range, the polyamide can minimize gelation while exhibiting excellent mechanical strength.

In addition to the terephthalic acid, examples of the dicarboxylic acid may include aliphatic dicarboxylic acids such as malonic acid, dimethyl malonic acid, succinic acid, glutaric acid, adipic acid, 2-methyl adipic acid, trimethyl adipic acid, pimelic acid, 2,2-dimethyl glutaric acid, 3,3-diethyl succinic acid, suberic acid, azelaic acid, sebacic acid, undecane diacid, dodecane diacid, and the like; alicyclic dicarboxylic acids such as 1,3-cyclopentanedicarboxylic acid, 1,4-cyclohexanedicarboxylic acid, and the like; aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, and the like; and mixtures thereof, without being limited thereto. These dicarboxylic acids may be used alone or in combination thereof. Preferably, a linear aliphatic dicarboxylic acid such as adipic acid, sebacic acid, and the like is used.

In the dicarboxylic acid component, the dicarboxylic acid excluding the terephthalic acid may be present in an amount of about 60 mol % to about 95 mol %, for example, about 70 mol % to about 95 mol %, specifically about 70 mol % to about 90 mol %. Within this range, the polyamide can minimize gelation while exhibiting excellent mechanical strength.

As needed, multi-valent carboxylic acid components such as trimellitic acid, trimesic acid, pyromellitic acid and the like may be used together in a small amount.

In the present invention, the diamine component contains 50 mol % to 100 mol % of p-xylylenediamine, about 70 mol % to about 100 mol % of xylylenediamine, and about 0 mol % to about 30 mol % of other diamines excluding the xylylenediamine Within this range, the polyamide can exhibit excellent properties in terms of mechanical strength, heat resistance, color and balance therebetween. The total amount of the xylylenediamine and the diamine excluding the xylylenediamine is 100 mol %.

As used herein, the term "xylylenediamine" includes three types of xylylenediamine isomers, that is, o-xylylenediamine, m-xylylenediamine (MXDA), and p-xylylenediamine (PXDA).

In the xylylenediamine, p-xylylenediamine may be present in an amount of 50 mol % to 100 mol %, for example, about 50 mol % to about 90 mol %, specifically about 50 mol % to about 80 mol %. If the amount of p-xylylenediamine is less than about 50 mol % in the xylylenediamine, the polyamide can suffer from deterioration in mechanical strength.

In the diamine component, the xylylenediamine may be present in an amount of about 70 mol % to about 100 mol %, for example, about 75 mol % to about 100 mol %, specifically about 80 mol % to about 100 mol %. If the amount of the xylylenediamine is less than about 70 mol % in the diamine component, the polyamide can suffer from deterioration in mechanical strength, heat resistance, color, and balance therebetween.

Examples of the other diamine excluding the xylylenediamine may include aliphatic alkylenediamines such as ethylenediamine, propanediamine, 1,4-butanediamine, 1,6-hexanediamine (hexamethylenediamine), 1,7-heptanediamine, 1,8-octanediamine, 1,9-nonanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, 5-methyl-1,9-nonanediamine, and the like; alicyclic diamines such as cyclohexanediamine, methylcyclohexanediamine, isophorone diamine, bis(4-aminocyclohexyl)methane, 1,3-bisaminomethylcyclohexane, 1,4-bisaminomethylcyclohexane, norbornane dimethanamine, tricyclodecane dimethanamine, and the like; and aromatic diamines such as p-phenylenediamine, m-phenylenediamine, 4,4'-diaminodiphenylsulfone, and 4,4'-diaminodiphenyl ether, without being limited thereto. The other diamines may be used alone or in combination thereof. Preferably, a linear aliphatic diamine such as hexamethylenediamine and the like is used.

In the diamine component, the diamines excluding the xylylenediamine may be present in an amount of about 0 mol % to about 30 mol %, for example, about 0 mol % to about 25 mol %, specifically about 0 mol % to about 20 mol %. If the amount of the diamines excluding the xylylenediamine exceeds about 30 mol % in the diamine component, the polyamide can suffer from deterioration in mechanical strength, heat resistance, color, and balance therebetween.

The low-order condensate may be prepared by placing an aqueous solution of the monomers (the dicarboxylic acid component and the diamine component) or salts thereof in, for example, a typical pressurized polymerization bath, and subjecting the same to polycondensation in an aqueous solvent while stirring.

The aqueous solvent refers to a solvent that contains water as a main component. Usable solvents besides water are not particularly limited so long as the solvents do not influence polycondensation reactivity or solubility. For example, alcohols such as methanol, ethanol, propanol, butanol, ethylene glycol, and the like, may be used as the solvents.

The moisture content in a reaction system upon initiation of polycondensation may be set to be in the range of about 15 wt % to about 35 wt % upon completion of polycondensation. Specifically, the moisture content in the reaction system may range from about 17 wt % to about 60 wt % upon initiation of polycondensation. Within this range, a substantially homogeneous solution is obtained upon initiation of polycondensation, thereby reducing time and energy in distillation and removal of moisture upon polycondensation while suppressing thermal degradation of the low-order condensate due to extension of reaction time.

In the polycondensation process, phosphorus catalysts may be used to improve polycondensation rate while preventing degradation upon polycondensation. Examples of the phosphorus catalysts may include hypophosphite, phosphate, hypophosphorous acid, phosphoric acid, phosphate ester, polymetaphosphates, polyphosphates, phosphine oxides, phosphonium halogen compounds, and mixtures thereof, without being limited thereto. For example, hypophosphite, phosphate, hypophosphorous acid, phosphoric acid and mixtures thereof may be used. Examples of the hypophosphite may include sodium hypophosphite, potassium hypophosphite, calcium hypophosphite, magnesium hypophosphite, aluminum hypophosphite, vanadium hypophosphite, manganese hypophosphite, zinc hypophosphite, lead hypophosphite, nickel hypophosphite, cobalt hypophosphite, ammonium hypophosphite, and the like. Specifically, sodium hypophosphite, potassium hypophosphite, calcium hypophosphite and magnesium hypophosphite may be used. Examples of the phosphate may include sodium phosphate, potassium phosphate, potassium dihydrogen phosphate, calcium phosphate, vanadium phosphate, magnesium phosphate, manganese phosphate, lead phosphate, nickel phosphate, cobalt phosphate, ammonium phosphate, diammonium hydrogen phosphate, and the like. The phosphate ester may include ethyloctadecyl phosphate. Examples of the polymetaphosphates may include sodium trimetaphosphate, sodium pentametaphosphate, sodium hexametaphosphate, polymetaphosphate, and the like. The polyphosphoric acid may include sodium tetrapolyphosphate. The phosphine oxide may include hexamethyl phosphoramide. The phosphorus catalysts may be provided in hydrate form.

The phosphorus catalyst may be present in an amount of about 0.0001 parts by weight to about 5 parts by weight, more preferably about 0.001 parts by weight to about 1 part by weight, based on 100 parts by weight of the monomers. Although the phosphorus catalyst can be added at any time before solid polymerization is completed, the phosphorus catalyst is preferably added between charging of the raw materials and the completion of polycondensation of the low-order condensates. Further, the phosphorus catalyst may be introduced multiple times, and two or more other phosphorus catalysts may be combined therewith.

In addition, polycondensation may be carried out in the presence of an end-capping agent. The end-capping agent allows easy control of the molecular weight of the low-order condensate while improving melt stability of the low-order condensate and polyamides finally produced. The end-capping agents are not particularly limited so long as the end-capping agents are mono-functional compounds having reactivity with a terminal amino group or a terminal carboxylic group. Examples of the end-capping agents may include monocarboxylic acids, monoamines, acid anhydrides such as anhydrous phthalic acid and the like, monoisocyanate, monoacid halides, monoesters, and monoalcohols, without being limited thereto. Specifically, monocarboxylic acids or monoamines may be used in terms of reactivity and stability of end-capping. More specifically, monocarboxylic acids may be used for easy handling.

The monocarboxylic acids are not particularly limited so long as the monocarboxylic acids are reactive with an amino group. Examples of the monocarboxylic acids may include aliphatic monocarboxylic acids such as acetic acid, propionic acid, butyric acid, valeric acid, caproic acid, caprylic acid, lauric acid, tridecylic acid, myristic acid, palmitic acid, stearic acid, pivalic acid, isobutyric acid, and the like; alicyclic monocarboxylic acids such as cyclohexane carboxylic acid, and the like; aromatic monocarboxylic acids such as benzoic acid, toluic acid, a-naphthalene carboxylic acid, β-naphthalene carboxylic acid, methylnaphthalene carboxylic acid, phenylacetic acid, and the like; and mixtures thereof. Specifically, acetic acid, propionic acid, butyric acid, valeric acid, caproic acid, caprylic acid, lauric acid, tridecylic acid, myristic acid, palmitic acid, stearic acid, and benzoic acid may be used given reactivity, stability of end-capping, price, and the like.

The monoamines are not particularly limited so long as the monoamines have reactivity with a carboxylic group. Examples of the monoamines may include aliphatic monoamines such as methylamine, ethylamine, propylamine, butylamine, hexylamine, octylamine, decylamine, stearylamine, dimethylamine, diethylamine, dipropylamine, dibutylamine, and the like; alicyclic monoamines such as cyclohexylamine, dicyclohexylamine, and the like; aromatic monoamines such as aniline, toluidine, diphenyl amine, naphthylamine, and the like; and mixtures thereof. Specifically, butylamine, hexylamine, octylamine, decylamine, stearylamine, cyclohexylamine and aniline may be used given reactivity, melting point, stability of end-capping, price, and the like.

The amount of the end-capping agent used in preparation of the low-order condensate may depend on reactivity and melting point, reaction apparatus, reaction conditions of the end-capping agents, and the like. For example, the end-capping agent may be present in an amount of about 0.1 parts by mole to about 15 parts by mole relative to 100 parts by mole the dicarboxylic acid or the diamine.

Preparation of the low-order condensate according to the present invention may be performed at elevated temperature and pressure while stirring the reactants. The polymerization temperature (reaction temperature) may be controlled after introducing the raw materials, and the polymerization pressure (reaction pressure) may be controlled depending on the progress of polymerization.

In this process, the reaction temperature may range from about 200° C. to less than about 230° C., for example, from 210° C. to about 225° C. Within this temperature range, a desired low-order condensate can be efficiently obtained without side reaction such as gelation.

In this process, the reaction pressure may range about 0.5 MPa to about 3 MPa, for example, from about 1.0 MPa to about 2.5 MPa. Within this range, the temperature and moisture content in a reaction system can be easily controlled, and the low-order condensate can be easily discharged. Further, since it is possible to use a reactor having low pressure resistance, it is advantageous in terms of economic feasibility, and the moisture content in the reaction system can be lowered, thereby increasing the degree of polymerization of the low-order condensate.

Further, in this process, the reaction time may range from about 0.5 hours to about 4 hours, for example, from about 1 hour to about 3 hours. Herein, the reaction time refers to a period of time from a time point of reaching the reaction temperature of the present invention to initiation of discharging operation. Within this range, reaction can reach sufficient reaction rate, whereby unreacted materials do not remain in the system and a homogeneous low-order condensate can be obtained. Further, it is possible to obtain a high quality low-order condensate without excessive thermal history.

In this process, the moisture content in the reaction system upon completion of reaction of the low-order condensate may range from about 15 wt % to about 35 wt %, for example, from about 20 wt % to about 35 wt %. Herein, the expression "upon completion of reaction" refers to a time point when the low-order condensate has a certain degree of polymerization to initiate an operation of discharging the low-order condensate. The moisture content includes water of condensation produced during reaction. In order to keep the moisture content within the above range, the moisture content to be introduced into the reaction system may be adjusted given the amount of water of condensation to be produced, or a predetermined amount of water may be distilled off or removed upon adjustment of the reaction pressure in an reactor equipped with a condenser and a pressure control valve. Within this range, since precipitation or solidification of the low-order condensate substantially does not occur in the reaction system, discharge of the low-order condensate can be easily carried out. Furthermore, a low-order condensate having a sufficient degree of polymerization can be easily obtained and the discharge rate can be enhanced due to low moisture content to be separated by evaporation, thereby improving preparation efficiency.

The process may further include a salt adjustment process and/or an enrichment process prior to polymerization of the low-order condensate, as needed. The salt adjustment process refers to generation of salts from the dicarboxylic acid component and the diamine component. The salt adjustment process may be regulated to pH±0.5 of a neutralization point of the salts, preferably to about pH±0.3 of a neutralization point of the salts. In the enrichment process, the raw materials may be enriched to have a concentration of about +2 wt % to about +90 wt %, for example, about +5 wt % to about +80 wt %. The enrichment process may be performed at about 90° C. to about 220° C., for example, at about 100° C. to about 210° C., specifically at about 130° C. to about 200° C. The enrichment process may be performed, for example, at about 0.1 MPa to about 2.0 MPa. Typically, the pressure of the enrichment process is controlled to be not more than that of the polymerization pressure. In order to promote the enrichment process, forced discharge by, for example, a nitrogen stream may be carried out. The enrichment process is effective in reduction of the polymerization time.

In this process, the low-order condensate may be reacted to have an inherent viscosity (IV) of about 0.07 dL/g to about 0.40 dL/g, for example, about 0.10 dL/g to about 0.25 dL/g, as measured at 25° C. and at a concentration of 0.5 g/dL in concentrated sulfuric acid after removing the low-order condensate from a reaction chamber (after cooling). Within this range, low melting point materials do not remain, and thus fusion or attachment of resin powder in the reactor upon solid polymerization does not occur, thereby preventing precipitation or solidification of the low-order condensate in the reaction system.

In this process, in order to obtain the low-order condensate, polycondensation may be performed in a batch mode or in a continuous mode. Further, polycondensation for producing the low-order condensate is preferably performed under stirring in order to inhibit attachment of the low-order condensate to the reaction chamber while securing uniform polymerization.

<Process of Discharging and Cooling Low-Order Condensate>

In this process, the low-order condensate obtained above is discharged from the reaction chamber and then subjected to cooling. The process of discharging and cooling is performed by removing the low-order condensate prepared in the above process from the reaction chamber. The process of discharging and cooling may be performed under atmospheric pressure or less in an inert gas atmosphere under conditions that the temperature of the reaction system is within the above range and that the moisture content in the reaction system upon completion of reaction is within the above range. The process of discharging and cooling does not require a pressure vessel controlled to a specific pressure and separate supply of steam into the reaction chamber upon removal of the low-order condensate from the reaction chamber. In addition, it is possible to obtain the low-order condensate through a simple and effective manner in the form of non-foam powder or granules exhibiting low thermal degradation, sufficiently high inherent viscosity and high bulk density.

The inert gas atmosphere preferably has an oxygen concentration of about 1% by volume or less in order to inhibit oxidative degradation of the low-order condensate.

The discharge rate of the low-order condensate from the reaction chamber may be suitably adjusted depending upon scale of the reaction chamber, the amount of material in the reaction chamber, temperature, a size of a discharge outlet, a length of a nozzle, and the like. For example, discharge of the low-order condensate may be performed such that the discharge rate per cross-sectional area of the discharge outlet is about 2000 kg/s/m$^2$ to about 20,000 kg/s/m$^2$. Within this range, collapse, aggregation, and fusion to a reactor wall can be prevented or do not occur during solid polymerization described below, handling properties are good, and a large amount of low-order condensate can be supplied into a polymerization apparatus, thereby improving volume efficiency of the apparatus employed in solid polymerization.

Further, the low-order condensate discharged from the reaction chamber exhibits almost no thermal or oxidative degradation since the temperature of the low-order condensate is rapidly decreased to about 100° C. or less due to latent heat of vaporization when discharged.

Furthermore, since the low-order condensate discharged from the reaction chamber vaporizes most moisture by heat of the low-order condensate, this process allows cooling and drying of the low-order condensate to be performed simultaneously. Discharge under inert gas atmosphere such as nitrogen and the like or under pressure below atmospheric pressure is preferred since efficiency of drying and cooling can be improved. In addition, a cyclone type solid-gas separation apparatus may be used as a discharge container to improve efficiency of drying and cooling by preventing powder scattering upon discharge while enabling discharge under a high linear gas velocity.

The low-order condensate obtained as above has a sufficiently high inherent viscosity and a low residual amount of unreacted materials, and thus allows solid polymerization at high temperature without causing fusion or aggregation between the low-order condensate particles. Further, the low-order condensate suffers from little deterioration due to side reaction.

The low-order condensate may be subjected to compacting or crude milling in order to obtain a uniform particle diameter, as needed.

<Solid Polymerization>

In this process, the low-order condensate discharged from the reaction chamber is subjected to solid polymerization to prepare a polyamide. Solid polymerization may be performed subsequent to discharge of the low-order condensate from the reaction chamber, or may be performed after drying the low-order condensate discharged from the reaction chamber. Alternatively, solid polymerization may be performed after storing the low-order condensate discharged from the reaction chamber, or may be performed after subjecting the low-order condensate discharged from the reaction chamber to compacting or granulation. When the low-order condensate is subjected to solid polymerization (high degree polymerization), it is possible to obtain a polyamide that suffers from little thermal degradation.

The polymerization method and conditions during solid polymerization of the low-order condensate are not particularly limited. Any polymerization methods and conditions may be used so long as high degree polymerization can be carried out while maintaining a solid state without causing any fusion, aggregation and deterioration of the low-order condensate.

In order to prevent oxidative degradation of the low-order condensate and the polyamide, solid polymerization may be performed in an inert gas atmosphere such as helium gas, argon gas, nitrogen gas, carbon dioxide, and the like or under a reduced pressure.

Although the temperature of solid polymerization is not particularly limited, the maximum reaction temperature may range from about 170° C. to about 210° C., specifically from about 180° C. to about 210° C. As such, solid polymerization may be performed at a lower temperature, that is, under milder conditions, than in the related art. Further, the maximum reaction temperature may be obtained a certain time before completion of solid polymerization.

An apparatus for solid polymerization employed in this process is not particularly limited and any known apparatus may be used. Examples of the apparatus for solid polymerization may include uniaxial disks, kneaders, twin axial paddles, a vertical tower type apparatus, a vertical tower type device, a rotatory drum type, or a double cone type solid polymerization apparatus, drying device, and the like.

Although not particularly limited, the reaction time for solid polymerization may be about 1 hour to about 20 hours. During solid polymerization, the low-order condensate may be mechanically stirred or stirred by gas stream.

According to the present invention, in the process of preparing a low-order condensate, in the process of solid polymerization, or in an optional stage after solid polymerization, various fiber materials such as glass fibers, carbon fibers, and the like, additives such as inorganic powder fillers, organic powder fillers, coloring agents, UV absorbers, light stabilizers, antioxidants, antistatic agents, flame retardants, crystallization accelerators, plasticizers, lubricants, other polymers, and the like may be added.

As described above, the polyamide production method according to the present invention can produce polyamides having excellent properties in terms of mechanical strength, heat resistance, color, and balance therebetween without causing problems such as gelation and the like.

The polyamides obtained by the production method according to the present invention have excellent physical properties such as mechanical strength, heat resistance and color, low water absorption, chemical resistance, and balance therebetween. The polycondensation resin, alone or in the form of a composition with various additives or other polymers as needed, may be molded into various molded articles and fibers so as to exhibit such properties by means of various molding or spinning methods, for example, injection molding, blow molding, extrusion molding, compression molding, stretching, vacuum molding, and the like.

The obtained molded articles or fibers may be effectively used not only in engineering plastics, but also in industrial materials, such as electronic and electric components, automobile components, and office automation components, and in various applications such as industrial materials, domestic appliances, and the like.

The polyamide production method according to the present invention may be suitably applied to preparation of polyamides having a melting point of about 280° C. or more and a glass transition temperature of about 100° C. or more.

MODE FOR INVENTION

Next, the present invention will be described in more detail with reference to some examples. It should be understood that these examples are provided for illustration only and are not to be construed in any way as limiting the invention.

Evaluation of Properties

Measurement of inherent viscosity (IV), melting point, glass transition temperature, crystallization temperature and color, preparation of specimens, and property evaluation were performed as follows.

(1) Inherent Viscosity (IV)

A specimen solution was prepared by dissolving a specimen at a concentration of 0.5 g/dL in 96% concentrated sulfuric acid. Flow seconds of each of the 96% concentrated sulfuric acid and the specimen solution were measured using an Ubbelohde viscometer at 25° C. and the inherent viscosity was calculated according to Equation 3.

$$\eta_{inh}(\text{inherent viscosity})=\ln(\eta rel)/c \quad [\text{Equation 3}]$$

In Equation 3, $\eta_{rel}$ is t1/t0 (t1: flow seconds of the specimen, t0: flow seconds of Blank), and c is a solution speed (g/dL)).

(2) Melting Point, Glass Transition Temperature, Crystallization Temperature

With a DSC manufactured by Seiko Instruments Korea Inc., a non-crystalized sample was heated from 30° C. to a temperature 20° C. higher than a polymer melting peak at a temperature increase rate of 10° C./min in a nitrogen atmosphere at a flow rate of 10 ml/min, maintained for 5 minutes, and lowered to 100° C. at a temperature decrease rate of 10° C./min to measure the glass transition temperature of the sample. Here, an endothermic peak temperature in the course of temperature elevation was measured as the melting point, and an exothermic peak temperature through crystallization in the course of temperature decrease was measured as the crystallization temperature.

(3) Color (YI)

YI was measured using a compact color/whiteness meter (NW-11, Nippon Denshoku Industries Co., Ltd).

(4) Preparation of Specimen

A rectangular specimen (80 mm×10 mm×4.0 mm) was prepared under conditions as listed in Table 2 using an injection molding machine (SE18DUZ, Sumitomo Heavy Industries, Ltd).

TABLE 1

Molding temperature: 260~310° C. (a temperature 10° C. higher than the melting point of a polyamide prepared in each example was set.)
Mold temperature: 150° C.
Injection pressure: 120~140 MPa
Injection speed: 30 mm/second
Screw rpm: 150 rpm
Cooling test: 45 seconds (5) Property Evaluation of Specimen a) Bending Test Flexural strength and flexural elasticity were measured by a bending test using a universal material tester 2001-5 type (in-Tesuko Inc.) in accordance with JIS K7171: 2008 (ISO178: 2001) under conditions of 23° C., 50% RH, a test rate of 2 mm/min, and an inter-fulcrum distance of 64 mm.

b) Load Deformation Temperature

With a specimen placed flatwise, load deformation temperature was measured using an automatic HDT tester 6A-2 type (Toyo Seikiseisakusho Co., Ltd.) under a load of 1.80 MPa in accordance with JIS K7191-1: 2007 (ISO75-1: 2004) or JIS K7191-2: 2007 (ISO75-2: 2004).

EXAMPLES

Example 1

In a 1 L autoclave reactor equipped with a partial condenser, a pressure control valve, an observation window and a bottom discharge valve, 43.05 g (0.259 mole=20 mol %) of terephthalic acid, 151.45 g (1.036 mole=80 mol %) of adipic acid, 124.25 g (0.912 mole=70 mol %) of p-xylylenediamine, 53.25 g (0.391 mole=30 mol %) of m-xylylenediamine, 0.372 g (0.1 parts by weight based on 100 parts by weight of charged raw materials) of sodium hypophosphite monohydrate, and 82 g (18 parts by weight based on 100 parts by weight of the charged raw materials) of water were placed and purged with nitrogen. The temperature of the reactor was increased to 130° C. for 0.5 hours while stirring the raw materials, and maintained for 0.5 hours, thereby obtaining a homogeneous solution. Then, the inner temperature was increased to 225° C. for 1 hour and maintained. After the inner pressure reached 2 MPa, reaction was continued for 2 hours while removing water through distillation in order to maintain the pressure. After a certain period of reaction time, the prepared low-order condensate was discharged to a container through the bottom discharge valve at room temperature (25° C.) under a nitrogen atmosphere and atmospheric pressure while maintaining the temperature of the reaction bath and the moisture content (21 wt %) in a reaction system. The nozzle of the discharge valve had a diameter of 1 mm and discharge was performed for about 114 seconds. The oxygen concentration in the discharge container was about 0.1% by volume and the low-order condensate was obtained in the form of a white powder Immediately after discharge, the low-order condensate had a temperature of 83° C., a moisture content of 2.6 wt %, and an inherent viscosity (IV) of 0.16 dL/g.

Then, 300 g of the obtained low-order condensate was supplied into a 1000 mL round-bottom flask, which in turn was placed in a rotary evaporator equipped with an oil bath. After flushing with nitrogen, the flask was dipped in the oil bath while being rotated under supply of nitrogen at a flow rate of 1 L/min, and the inner temperature of the flask was increased to 200° C. for 1 hour, followed by solid polymerization at the same temperature for 4 hours. After a certain period of reaction time, the inner temperature of the flask was lowered to room temperature (25° C.), thereby obtaining a highly polymerized polyamide. The obtained polyamide had an inherent viscosity (IV) of 0.85 dL/g, a melting point of 291° C. as measured by DSC, a glass transition temperature of 105° C., a crystallization temperature of 234° C., and a YI of 5, thereby exhibiting a high degree of polymerization, a good color and high thermal resistance. A specimen was produced by injection molding of the obtained polyamide and properties of the specimen were evaluated. The specimen had a flexural strength of 185 MPa, a flexural elasticity of 4.3 GPa, and a load deformation temperature of 115° C., thereby exhibiting high strength, high rigidity, and high thermal resistance.

Example 2

Preparation, discharge and solid polymerization of a low-order condensate were carried out in the same manner as in Example 1 except that 21.67 g (0.130 mole=10 mol %) of terephthalic acid, 171.58 g (1.174 mole=90 mol %) of adipic acid, 125.12 g (0.919 mole=70 mol %) of p-xylylenediamine, and 53.62 g (0.394 mole=30 mol %) of m-xylylenediamine were used. Discharge of the low-order condensate was performed for 110 seconds and the low-order condensate was obtained in the form of a white powder Immediately after discharge, the low-order condensate had a temperature of 81° C., a moisture content of 2.4 wt %, and an inherent viscosity (IV) of 0.16 dL/g. After solid polymerization, the polyamide had an IV of 0.88 dL/g, a melting point of 297° C., a glass transition temperature of 103° C., a crystallization temperature of 246° C., and a YI of 5, thereby exhibiting a high degree of polymerization, a good color and high thermal resistance. A specimen was produced by injection molding of the obtained polyamide and properties of the specimen were evaluated. The specimen had a flexural strength of 182 MPa, a flexural elasticity of 4.2 GPa, and a load deformation temperature of 110° C., thereby exhibiting high strength, high rigidity, and high thermal resistance.

Example 3

Preparation, discharge and solid polymerization of a low-order condensate were carried out in the same manner as in Example 1 except that 21.67 g (0.130 mole=10 mol %) of terephthalic acid, 171.58 g (1.174 mole=90 mol %) of adipic acid, 107.25 g (0.787 mole=60 mol %) of p-xylylenediamine, and 71.50 g (0.525 mole=40 mol %) of m-xylylenediamine were used. Discharge of the low-order condensate was performed for 125 seconds and the low-order condensate was obtained in the form of a white powder Immediately after discharge, the low-order condensate had a temperature of 81° C., a moisture content of 2.3 wt %, and an IV of 0.18 dL/g. After solid polymerization, the polyamide had an IV of 0.92 dL/g, a melting point of 284° C., a glass transition temperature of 102° C., a crystallization temperature of 231° C., and a YI of 5, thereby exhibiting a high degree of polymerization, a good color and high thermal resistance. A specimen was produced by injection molding of the obtained polyamide and properties of the specimen were evaluated. The specimen had a flexural strength of 189 MPa, a flexural elasticity of 4.3 GPa, and a load deformation temperature of 109° C., thereby exhibiting high strength, high rigidity, and high thermal resistance.

Comparative Example 1

Preparation, discharge and solid polymerization of a low-order condensate were carried out in the same manner as in Example 1 except that the reaction temperature was set to 240° C., the reaction pressure was set to 2.4 MPa, and the moisture content in the reaction system upon discharge was set to 25 wt % in preparation of the low-order condensate. Discharge of the low-order condensate was performed for 120 seconds and the low-order condensate was obtained in the form of a white powder Immediately after discharge, the low-order condensate had a temperature of 85° C., a moisture content of 1.8 wt %, and an IV of 0.18 dL/g. After solid polymerization, the polyamide had an IV of 0.86 dL/g, a melting point of 288° C., a glass transition temperature of 104° C., a crystallization temperature of 221° C., and a YI of 12. As compared with the polyamide in Example 1, the polyamide had a low melting point and a low crystallization temperature, and exhibited a poor color. Although preparation of a specimen through injection molding of the obtained polyamide was attempted, a good specimen could not be obtained due to gelation of the polyamide in the molding machine.

Comparative Example 2

A low-order condensate was prepared in the same manner as in Example 1 except that 66.01 g (0.397 mole=38 mol %) of terephthalic acid, 95.79 g (0.655 mole=62 mol %) of adipic acid, and 140.95 g (1.035 mole=100 mol %) of m-xylylenediamine were used and the low-order condensate was prepared under conditions of a reaction temperature of 220° C. and a reaction pressure of 1.0 MPa for a reaction time of 5 hours. Upon discharge of the low-order condensate, the moisture content in the reaction system was 12 wt %, discharge was carried out for 140 seconds, and the low-order condensate was obtained in the form of a white powder. Immediately after discharge, the low-order condensate had a temperature of 110° C., a moisture content of 1.2 wt %, and an IV of 0.25 dL/g. Solid polymerization of the low-order condensate was performed under a vacuum of 1 mmHg (0.13 kPa) at 210° C. for 6 hours. After solid polymerization, the polyamide had an IV of 1.70 dL/g, a melting point of 252° C., a glass transition temperature of 121° C., a crystallization temperature of 189° C., and a YI of 16. As compared with the polyamide in Example 1, the polyamide had a low melting point and exhibited a poor color. A specimen was produced by injection molding of the obtained polyamide. The obtained specimen was translucent and insufficiently crystallized, and the presence of foreign matter in the specimen could be confirmed with the naked eye. It was confirmed that the foreign matter was not dissolved in concentrated sulfuric acid and contained a gel therein. The specimen had a flexural strength of 165 MPa, a flexural elasticity of 3.4 GPa, and a load deformation temperature of 125° C. The flexural elasticity of the specimen was lower than those of the specimens of Examples.

Comparative Example 3

The same raw materials as those of Example 1 were introduced into the reactor, and the same apparatuses as those of Example 1 were used. Here, after a low-order condensate was obtained through polymerization under conditions of 210° C. and 2 MPa for 2 hours, the inner pressure was lowered to atmospheric pressure for 1 hour, instead of discharge and solid polymerization of the low-order condensate, while increasing the inner temperature to 300° C., followed by melt polymerization for 30 minutes. Then, a prepared polyamide was discharged to a water bath through the bottom discharge valve. The obtained polyamide was not dissolved in concentrated sulfuric acid due to gelation, and had a YI of 18 corresponding to a yellow color, a melting point of 275° C., and a crystallization temperature 188° C.

Evaluation results are shown in Table 2.

TABLE 2

|  |  |  |  | Example 1 | Example 2 | Example 3 | Comparative Example 1 | Comparative Example 2 | Comparative Example 3 |
|---|---|---|---|---|---|---|---|---|---|
| Injection | Raw dicarboxylic acid | TPA | | 20 mol % | 10 mol % | 10 mol % | 20 mol % | 38 mol % | 20 mol % |
|  |  | AdA | | 80 mol % | 90 mol % | 90 mol % | 80 mol % | 62 mol % | 80 mol % |
|  | Raw diamine | PXDA | | 70 mol % | 70 mol % | 60 mol % | 70 mol % | 0 mol % | 70 mol % |
|  |  | MXDA | | 30 mol % | 30 mol % | 40 mol % | 30 mol % | 100 mol % | 30 mol % |
|  | Catalyst | SHM | | 0.1 parts by weight | ← | ← | ← | ← | ← |
|  | Water | | | 18 wt % | ← | ← | ← | 10 wt % | 18 wt % |
| Reaction conditions of low-order condensate | Reaction temperature | | (° C.) | 225 | 225 | 225 | 240 | 220 | 210 |
|  | Reaction pressure | | (MPa) | 2.0 | 2.0 | 2.0 | 2.4 | 1.0 | 2.0 |
|  | Reaction time | | (hr) | 2 | 2 | 2 | 2 | 5 | 2 |
|  | Moisture content in reaction system upon discharge | | (wt %) | 21 | 21 | 21 | 25 | 12 |  |
| Discharge conditions of low-order condensate | Pressure of discharge container | | | Atmospheric pressure | ← | ← | ← | ← | Melt polymerization |
|  | Oxygen concentration | | (vol %) | 0.1 | ← | ← | ← | ← |  |
|  | Temperature after discharge | | (° C.) | 83 | 81 | 81 | 85 | 110 |  |
|  | Moisture content after discharge | | (wt %) | 2.6 | 2.4 | 2.3 | 1.8 | 1.2 |  |
| Low-order condensate | IV | | (dL/g) | 0.16 | 0.16 | 0.18 | 0.18 | 0.25 |  |
| Conditions for solid polymerization | Maximum reaction temperature | | (° C.) | 200 | 200 | 200 | 200 | 210 |  |
|  | Reaction time | | (hr) | 4 | 4 | 4 | 4 | 6 |  |
| IV | | | (dL/g) | 0.85 | 0.88 | 0.92 | 0.86 | 1.70 | — |
| Melting point | | | (° C.) | 291 | 297 | 284 | 288 | 252 | 275 |
| Glass transition temperature | | | (° C.) | 105 | 103 | 102 | 104 | 121 | 104 |
| Crystallization temperature | | | (° C.) | 234 | 246 | 231 | 221 | 189 | 188 |

TABLE 2-continued

|  |  | Example 1 | Example 2 | Example 3 | Comparative Example 1 | Comparative Example 2 | Comparative Example 3 |
|---|---|---|---|---|---|---|---|
| YI | | 5 | 5 | 5 | 12 | 16 | 18 |
| Flexural strength | (MPa) | 185 | 182 | 189 | — | 165 | — |
| Flexural elasticity | (GPa) | 4.3 | 4.2 | 4.3 | — | 3.4 | — |
| Load deformation temperature | (° C.) | 115 | 110 | 109 | — | 125 | — |
| Remarks | | — | — | — | Gelation upon molding | Gel mixing | Gelation upon polymerization |

TPA: terephthalic acid,
AdA: adipic acid,
PXDA: p-xylylenediamine,
MXDA: m-xylylenediamine,
SHM: sodium hypophosphite monohydrate From the results of Table 2, it can be seen that the polyamide production method according to the present invention (Example 1 to 3) did not provide a problem such as gelation and the like. Further, it can be seen that the polyamide prepared by the method according to the present invention had excellent properties in terms of mechanical strength, heat resistance, color, and the like.

It should be understood that various modifications, changes, alterations, and equivalent embodiments can be made by those skilled in the art without departing from the spirit and scope of the present invention.

The invention claimed is:

1. A polyamide production method comprising:
preparing a low-order condensate through polycondensation of a dicarboxylic acid component containing about 5 mol % to about 40 mol % of terephthalic acid and a diamine component comprising about 50 mol % to about 70 mol % of p-xylylenediamine and about 30 mol % to about 50 mol % of m-xylylenediamine at a reaction temperature of about 200° C. to less than about 230° C. after adding both the dicarboxylic acid component and the diamine component to a reactor;
discharging and cooling the low-order condensate at atmospheric pressure or less under an inert gas atmosphere; and
solid-polymerizing the discharged and cooled low-order condensate,
wherein the polycondensation is performed in the presence of an end-capping agent.

2. The polyamide production method according to claim 1, wherein preparing the low-order condensate is performed under conditions of a reaction pressure of about 0.5 MPa to about 3 MPa, a reaction time of about 0.5 hours to about 4 hours, and a moisture content of about 15 wt % to about 35 wt % in a reaction system upon completion of reaction, and the discharged and cooled low-order condensate has an inherent viscosity of about 0.07 dL/g to about 0.40 dL/g, as measured at a concentration of about 0.5 g/dL and at a temperature of about 25° C. in concentrated sulfuric acid.

3. The polyamide production method according to claim 1, wherein the solid polymerization is performed at a maximum reaction temperature of about 170° C. to about 210° C.

4. The polyamide production method according to claim 1, wherein the polyamide has a melting point of about 280° C. or more and a glass transition temperature of about 100° C. or more.

5. The polyamide production method according to claim 1, further comprising:
an enrichment process before preparation of the low-order condensate.

6. The polyamide production method according to claim 1, wherein the step of preparing a low-order condensate takes place in an aqueous solution.

* * * * *